US005291366A

United States Patent [19]

Giese et al.

[11] Patent Number: 5,291,366

[45] Date of Patent: Mar. 1, 1994

[54] SURGE VOLTAGE ARRESTER

[75] Inventors: Klaus Giese, Neuenhof; Walter Nydegger, Winterthur; Walter Schmidt, Bellikon, all of Switzerland

[73] Assignee: Asea Brown Boveri Ltd., Baden, Switzerland

[21] Appl. No.: 966,417

[22] Filed: Oct. 26, 1992

[30] Foreign Application Priority Data

Dec. 4, 1991 [CH] Switzerland .................... 3558/91-3

[51] Int. Cl.[5] .................................. H02H 1/00

[52] U.S. Cl. .................................. 361/127; 361/117; 338/21

[58] Field of Search .................. 361/127, 126, 117; 338/21

[56] References Cited

U.S. PATENT DOCUMENTS 4,864,456 9/1989 Thuillier et al. .................. 361/127
5,113,306 5/1992 Veverka et al. .................. 361/127

FOREIGN PATENT DOCUMENTS 0281945 3/1987 European Pat. Off. .
0230103 7/1987 European Pat. Off. .
0280189 8/1988 European Pat. Off. .
0445054 9/1991 European Pat. Off. .
2641423 7/1990 France .
WO91/17554 11/1991 PCT Int'l Appl. .

OTHER PUBLICATIONS

Patent Abstracts of Japan, Publ. No. JP63312602 published Dec. 21, 1988; Abstract vol. 013155 published Apr. 14, 1989.

*Primary Examiner*—Todd Deboer
*Attorney, Agent, or Firm*—Burns, Doane, Swecker & Mathis

[57] ABSTRACT

This surge voltage arrester has two connecting fittings (1, 2) which are braced with respect to one another. At least one pellet (7) consisting of varistor material is clamped in between the connecting fittings (1, 2).

It is intended to create a surge voltage arrester which can be produced using simple means and which, in addition, can be cast around in a simple manner. This is achieved in that at least two insulating clamping elements, which are arranged symmetrically, are provided for bracing the connecting fittings (1, 2). The clamping elements, the at least one pellet (7) and, partially, the connecting fittings (1, 2) have insulating plastic material cast around them to form a monolithic block.

7 Claims, 3 Drawing Sheets

SURGE VOLTAGE ARRESTER

BACKGROUND OF THE INVENTION

1. Field of the Invention

The invention is based on a surge voltage arrester.

2. Discussion of Background

EP-A1-0281,945 discloses a surge voltage arrester having two fittings which are braced with respect to one another by means of an insulating rod. The insulating rod passes through varistor elements, which are constructed in a cylindrical shape and are arranged in layers to form a stack, in their center. The fittings bound the stack of varistor elements. The described arrangement has insulating material cast around it, insulating material also being fitted inside the stack in the region around the insulating rod.

The production of such a surge voltage arrester requires a number of process steps. In particular, the casting around the insulating rod may necessitate special knowledge.

SUMMARY OF THE INVENTION

Accordingly, one object of the invention is to provide a novel surge voltage arrester which can be produced using simple means and, additionally, is simple to cast around.

The advantages achieved by the invention can essentially be seen in that the assembly of the surge voltage arrester is significantly simplified. Only one simple template is necessary for assembly of the active parts of the surge voltage arrester, since the axial guidance of the two connecting fittings is already ensured by the plastic strips, which are connected such that they fit by virtue of their shape. This connection which its by virtue of shape additionally ensures that the complete arrester has a high resistance capability to breaking in bending. It is furthermore advantageous that the plastic strips which are located outside the pellets can be cast in without problems during the casting process.

The grooved disks ensure that a large number of contact points are formed for faultless current transfer. The more unambiguously defined contact points there are, the better is the current carrying capability of a current transfer. In addition, these soft grooved disks compensate advantageously for any unevennesses in the pellet surface, so that these unevennesses cannot reduce the current carrying capability. It has been found to be particularly advantageous for the grooved disks to be sealed against the ingress of insulating material during the casting process at the same time as the current transfer zones of the surge voltage arrester.

The further refinements of the invention are the subject matter of the dependent claims.

The invention, its development and the advantages which can be achieved thereby are explained in more detail in the following text, using the drawing which shows only one possible embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

In all the figures, elements having the same effect are provided with the same reference symbols.

DESCRIPTION OF THE PREFERRED EMBODIMENTS

Figure 1:
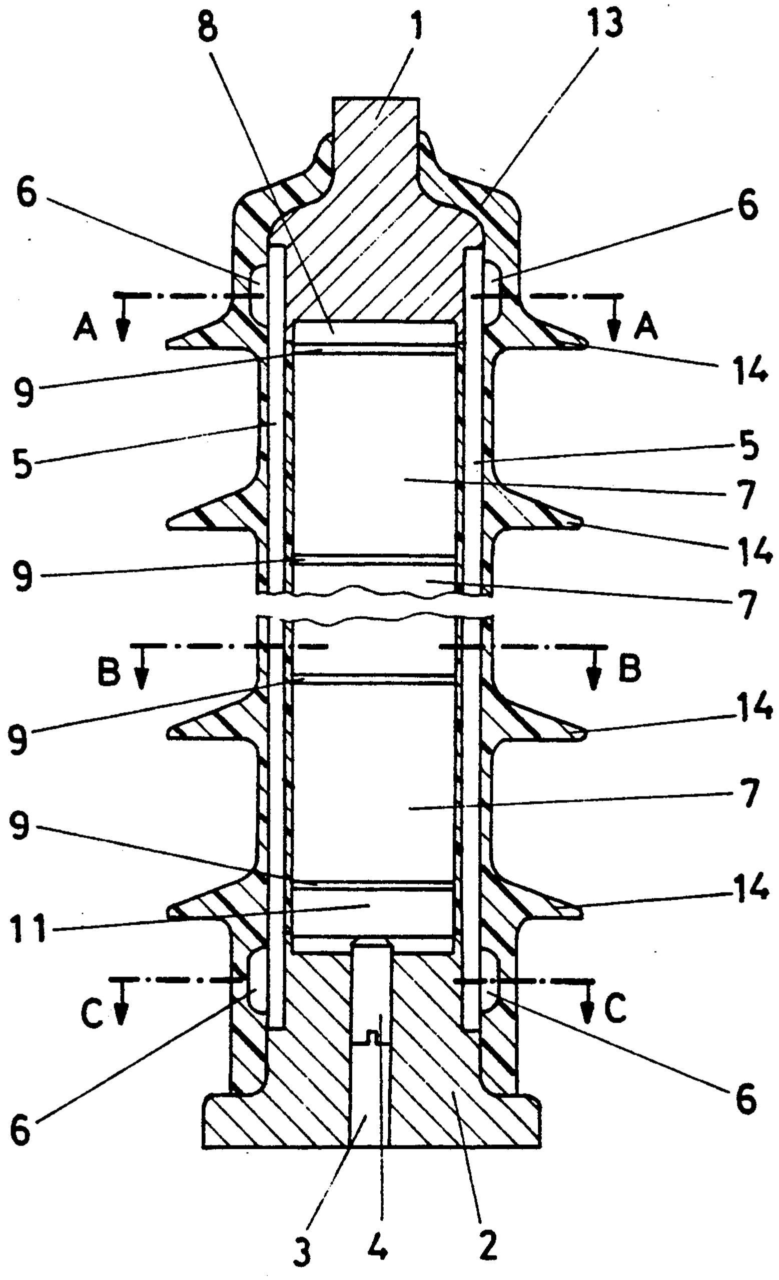
FIG. 1 shows a section through a first embodiment of the invention.
Figure 2:
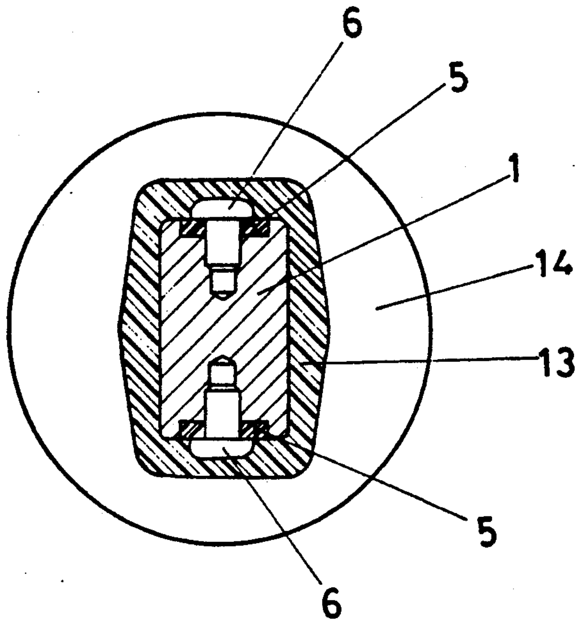
FIGS. 2 to 4 show further sections through this first embodiment of the invention.
Figure 4:
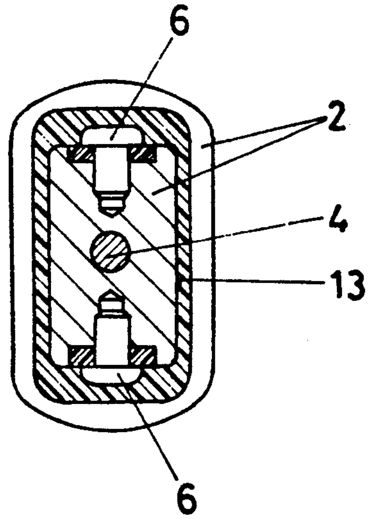

Referring now to the drawings, wherein like reference numerals designate identical or corresponding parts throughout the several views, FIG. 1 shows a schematic representation of a longitudinal section through a surge voltage arrester according to the invention. The surge voltage arrester has two connecting fittings 1, 2, consisting of metal. The connecting fitting 1 is provided with an attachment capability, which is not shown, for an electrical conductor. A threaded hole 3, in which a pressure screw 4 is arranged, is provided in the center of the connecting fitting 2. The two connecting fittings 1, 2 are connected to one another by means of two glass fiber reinforced plastic strips 5 which are rigid but can expand somewhat in the axial direction. These plastic strips 5 are attached to the connecting fittings 1, 2 by means of screws 6. The plastic strips 5 have a rectangular cross section and are arranged symmetrically with respect to the longitudinal axis of the surge voltage arrester. As can be seen in FIG. 2 and FIG. 4, the rectangular plastic strips 5 are embedded in the surface of the respective connecting fitting 1 or 2 such that they fit by virtue of their shape. This embedding achieves a particularly high resistance to bending and furthermore a simplification of assembly since, as a result of this good guidance, alignment of this arrangement during assembly is unnecessary. In this case, the connecting fittings 1, 2 have rectangular cross sections, but it is also possible to provide other cross sections, for example cylindrical. The rectangular cross section of the connecting fittings 1, 2 was selected for reasons of saving material and weight.

The frame which is formed by the connecting fittings 1, 2 and the plastic strips 5 surrounds pellets 7 consisting of varistor material, for example ZnO. The pellets 7 are of cylindrical construction. A fitting plate 8 consisting of metal is inserted in a recess in the connecting fitting 1. A grooved disk 9, which is of cylindrical construction and has a central hole 10 is inserted between the plate 8 and the closest pellet 7, and likewise between adjacent pellets 7. A grooved disk 9 which rests on a pressure plate 11 is likewise provided after the bottom pellet 7. The pressure screw 4 acts on the pressure plate 11 and passes the current from the pressure plate 11 to the connecting fitting 2. When the described parts are being fitted into the frame, care must be taken that no gaps remain open between the parts into which insulating material could penetrate during casting. The actual contact force between the active parts is produced by the pressure screw 4 which is tightened to a specified torque and is subsequently secured in one of the known ways. The arrangement manufactured in this manner is inserted into a mold and has a sheath 13 consisting of electrically insulating plastic cast around it without any gaps or cavities. Silicon rubber, for example, is a suitable plastic for this purpose. Insulating shields 14 are integrally formed at the same time during casting around. The complete arrangement is surrounded by the sheath 13, only the parts of the connecting fittings 1, 2 which are required for electrical connections remaining metallically bare.

Figure 3:
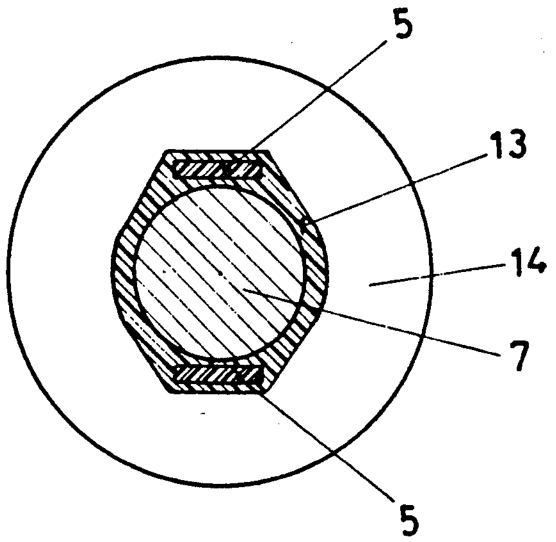
Figure 5:
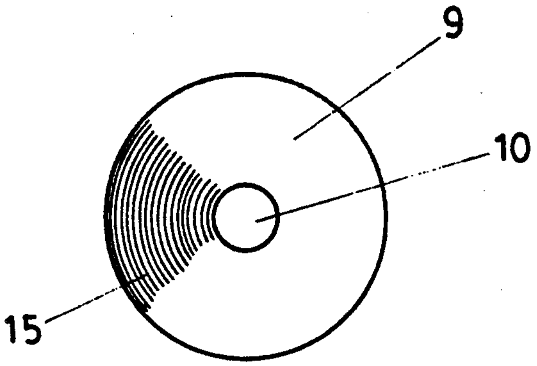
FIG. 5 shows a view of a grooved disk.
Figure 6:
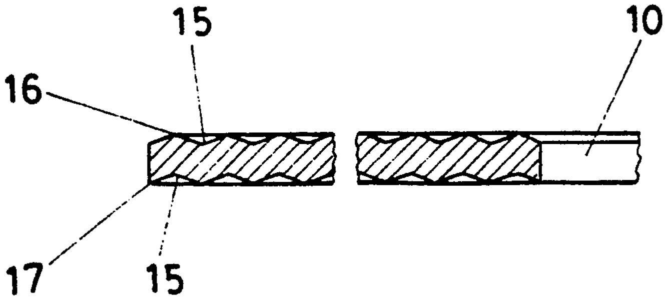
FIG. 6 shows an enlarged section through a grooved disk according to FIG. 5.

FIG. 1 shows three section lines, the section A—A in FIG. 2, the section B—B in FIG. 3 and the section C—C in FIG. 4 being shown. FIG. 5 shows the grooved disk 9 which has a central hole 10. A large number of grooves 15 surround this hole 10 concentrically. The grooved disk 9 is produced from annealed aluminum. FIG. 10 shows an enlarged section through this grooved disk 9. The outermost edge 16, 17 of the outermost grooves 15 is additionally used in each case as a sealing edge against the ingress of plastic during casting. A large number of grooved shapes can be provided but an adequate sealing edge must always be formed and, in addition, it must be ensured that a sufficient number of contact points can be constructed during assembly of the grooved disks 9.

It can also be provided that, for example, plastic strips or bundles of plastic fibers are used instead of the rigid plastic strips 5 if no stringent requirements are placed on the cantilever strength of the surge voltage arrester. It is also possible to provide cross sections of the plastic strips 5 which are other than rectangular.

The described figures are considered in somewhat more detail in order to explain the method of operation. The contact force which is applied onto the arrangement by the pressure screw 4 ensures that the edges 16, 17 of the grooved disks 9 deform locally, as a result of which defined contacts in the form of points are produced which permit particularly good current transfer. The best current transfer is achieved when a large number of such contacts in the form of points are present and are distributed uniformly over a surface. The grooved disks 9 ensure this large number of contacts in the form of points. In this way it is ensured that the comparatively very high current which flows when the surge voltage arrester is triggered is always dissipated safely through the active part of the surge voltage arrester without it being possible for the current transfers to be overloaded in places with consequent fusing, which causes defects. The operational reliability of the arrester is considerably increased in this way.

The operational reliability is also assisted in that the said contact force is maintained over the complete life of the surge voltage arrester, since the plastic strips 5 also act as spring elements which expand somewhat when the pressure screw 4 is tightened and maintain this pretensioning. This pretensioning is selected such that any shrinkage of the grooved disks 9 can also always be compensated for reliably.

The casting of the complete arrangement into the sheath 13 advantageously ensures that both the pellets 7 and the plastic strips 5 cannot absorb moisture from the environmental air, so that their dielectric strength is not reduced. The monolithic block into which the complete surge voltage arrester is constructed has good mechanical stability, especially also with respect to the high cantilever strength and, in addition, it is insensitive to climatic influences, so that it can advantageously be used in all climatic zones.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A surge voltage arrester having two connecting fittings (1, 2) which are braced with respect to one another, and having at least one pellet (7) which is clamped in between the connecting fittings (1, 2) and consists of varistor material, in which at least two insulating clamping elements, which are arranged symmetrically adjacent to the at least one pellet (7), are provided for bracing the connecting fittings (1, 2), and in which the at least two clamping elements, the at least one pellet (7) and, partially, the connecting fittings (1, 2) have insulating plastic material cast around them to form a monolithic block wherein
   rigid plastic strips (5) which can expand somewhat in the axial direction are provided as clamping elements, and
   these rigid plastic strips (5) are guided such that they fit by virtue of their shape in each of the connecting fittings (1, 2), and are connected thereto.

2. The surge voltage arrester as claimed in claim 1, wherein
   strips of glass fiber reinforced epoxy resin are provided as the rigid plastic strips (5).

3. The surge voltage arrester as claimed in claim 1, wherein
   a pressure screw (4) is provided in order to produce faultless current transfer points between the connecting fittings (1, 2) and the at least one pellet (7).

4. The surge voltage arrester as claimed in claim 1, wherein
   in each case one metallic grooved disk (9) ensures current transfer at every current transfer point between the at least one pellet (7) and the connecting fittings (1, 2), and
   in each case one metallic grooved disk (9) ensures current transfer between adjacent pellets (7).

5. The surge voltage arrester as claimed in claim 4, wherein
   the metallic grooved disk (9) has an external contour matched to the pellets (7), and
   the metal of the grooved disk (9) is annealed.

6. The surge voltage arrester as claimed in claim 5, wherein
   both the pellets (7) and the grooved disks (9) are of cylindrical construction.

7. The surge voltage arrester according to claim 4, wherein
   the grooved disk (9) is manufactured from aluminum.

* * * * *